United States Patent [19]

Emerson

[11] 3,832,442

[45] Aug. 27, 1974

[54] METHOD FOR PRODUCING ALUMINA HYDRATES

[75] Inventor: Robert B. Emerson, Baton Rouge, La.

[73] Assignee: Kaiser Aluminum & Chemical Corporation, Oakland, Calif.

[22] Filed: Oct. 20, 1970

[21] Appl. No.: 82,486

[52] U.S. Cl.................. 423/111, 423/130, 423/625
[51] Int. Cl. ........ C01f 7/02, B01d 15/00, B01j 1/22
[58] Field of Search ....... 23/143; 423/111, 130, 625

[56] References Cited
UNITED STATES PATENTS

| | | | |
|---|---|---|---|
| 2,614,029 | 10/1952 | Moede................................ | 423/25 |
| 2,888,323 | 5/1959 | Teichner............................. | 23/143 |
| 2,926,135 | 2/1960 | Engel et al...................... | 208/299 X |
| 3,002,809 | 10/1961 | Walker................................ | 423/121 |
| 3,226,191 | 12/1965 | Osment et al...................... | 423/628 |

FOREIGN PATENTS OR APPLICATIONS

| | | | |
|---|---|---|---|
| 799,243 | 8/1958 | Great Britain........................ | 23/143 |
| 123,720 | 0/1920 | Great Britain........................ | 23/143 |
| 38-7951 | 4/1963 | Japan.................................. | 423/111 |
| 1,239,447 | 7/1960 | France................................ | 423/119 |

OTHER PUBLICATIONS

Edwards, "The Aluminum Industry," Vol. I, Pages 71–73, 136, 172 (1930).

Lister, "Journal of Applied Chemistry," Vol. 2, Pages 280–283, (1952).

Newsome et al., "Alumina Properties," Technical Paper No. 10, Second Revision, 1960, pages 57–58.

*Primary Examiner*—M. Weissman
*Attorney, Agent, or Firm*—Paul E. Calrow; Andrew E. Carlay

[57] ABSTRACT

Alumina hydrates of improved purity and enhanced whiteness are recovered from impure alkali aluminate liquor by contacting the liquor with an active alumina to remove by sorption undesired color bodies and metallic impurities.

8 Claims, No Drawings

METHOD FOR PRODUCING ALUMINA HYDRATES

BACKGROUND OF THE INVENTION

This invention relates to a method for producing alumina hydrates of improved purity and enhanced whiteness. More particularly, it relates to a method for treating impure alkali aluminate solutions, such as Bayer process sodium aluminate liquors, with an active alumina to remove by sorption undesired color bodies and metallic impurities. Alumina hydrates precipitated from treated impure alkali aluminate solutions exhibit enhanced whiteness and high level of purity.

Alumina hydrates are widely used in the preparation of reduction grade alumina, as precursors for catalyst supports, fillers for paints and for many other purposes. For all of these uses it is desirable to employ alumina hydrates which are substantially devoid of metallic impurities and are characterized by the absence of color bodies.

One of the most commonly used methods for producing alumina hydrates is the well-known Bayer process. In this process aluminous ore, such as bauxite, is digested with an alkali material, for example caustic soda, at elevated temperature. The digestion results in a slurry containing in solution alumina in the form of sodium aluminate, other organic and inorganic caustic soluble compounds and a caustic insoluble residue called "red mud." To recover the alumina values from the slurry, the red mud is separated, generally by settling and/or by filtration. The filtrate, often called "liquor", is a supersaturated solution of sodium aluminate from which the alumina is precipitated in the form of alumina hydrates by seeding or other well-known methods. Due to dissolved and suspended inorganic and organic impurities present in the liquor, the color of the liquor is most often reddish-brown, sometimes even darker. The alumina hydrates precipitated from the liquor usually possess a relatively high surface area, and this surface area will sorb during and after precipitation a substantial quantity of metallic impurities and color bodies, which detrimentally affect the quality of the alumina hydrates. Washing of the precipitated alumina hydrates can only remove a very small quantity of these impurities and when the washed product is dried, it still possesses an undesirable brownish color, as well as a significant quantity of metal salts, for example Ca, Fe, Si and Zn compounds.

Specifications for aluminas prepared from alumina hydrates are quite stringent and the presence of metallic impurities and color bodies not only detract from the appearance of the aluminas, but the metallic impurities can also cause considerable operating difficulties. Additionally, when the dried alumina hydrate is to be used without calcination, for example, as a filler for paints, the color bodies alone can make the alumina hydrates unsuitable for this purpose.

It has already been suggested to filter impure sodium aluminate liquors on a carbonaceous filter, followed by bleaching, for example, with a sodium hypochlorite solution. The bleached liquor, while the color bodies were substantially eliminated, still contained a significant quantity of metallic impurities which could only be reduced to a low level by the addition of an agent such as sorbitol.

Not only does this prior art process present considerable operating difficulties due to the use of several filtration steps, but also adds substantial costs to the alumina hydrate preparation resulting from the use of substantial quantities of chemical treating agents such as bleach and sorbitol. In addition, the carbonaceous filter aid used must be discarded quite frequently as the pores of the filter become plugged rapidly.

Other prior art processes suggested the use of various treating agents, such as alpha-methyl cellulose. However, the use of this agent could only reduce the color bodies, without removing metallic impurities. The addition of complexing agents was also suggested to remove metallic impurities. This type of purification, while reducing the metallic impurity level, did not improve the color characteristics of the alumina hydrates precipitated from the treated liquor.

Combination of the addition of complexing agents and filter aids resulted in additional operating difficulties, and in many instances resulted in a combined effect which, instead of achieving the desired purpose, produced an inferior product, due to the sorption of the complexing agent on the filter aid. When the complexing agent was used after filtration of the impure liquor through a filter aid, the complexed metallic impurities usually remain in the solution and were adsorbed on the surface of the freshly precipitated alumina hydrate. When the complexing results in a solid product, this had to be removed by filtration from the sodium aluminate liquor prior to precipitation of the alumina hydrate, thereby adding process difficulties and material losses to the process of making alumina hydrates.

It has now been surprisingly discovered that if a small, but effective, quantity of active alumina is added to impure sodium aluminate liquors, not only can the color bodies be effectively removed, but a significant reduction in the metallic impurity content is simultaneously achieved in a simple and efficient manner.

BRIEF SUMMARY OF THE INVENTION

A method for enhancing the whiteness and purity of alumina hydrates produced from impure sodium aluminate liquors is provided wherein the impure liquor is contacted with an active alumina having a surface area of at least 50 $m^2/g$ to simultaneously remove from the liquor undesired color bodies and metallic ion impurities. Intimate contact is maintained between the active alumina and the liquor, while the temperature of the liquor is kept between about 40° and 90° C during the treatment. Subsequent to the treatment, the liquor is utilized to recover alumina hydrates which are of high purity and enhanced whiteness.

DETAILED DESCRIPTION OF THE INVENTION

This invention relates to a method of producing alumina hydrates of enhanced whiteness and purity. Specifically, it concerns a process of treating impure alkali aluminate solutions with an active alumina having a surface area of at least 50 $m^2/g$, to remove by sorption undesired color bodies and metallic impurities. This treatment is accomplished prior to the recovery of alumina hydrates from the alkali aluminate solution by precipitation.

For the purposes of the present invention, the expression "active alumina" refers to an alumina which possesses a surface area of at least 50 $m^2/g$, and wherein the alumina under the conditions of the present process when contacted with the impure alkali aluminate solution will not lose more than 30 percent of its weight by dissolution in the alkali aluminate solution within the temperature range between about 40° C and about 90° C during the contact time with the aluminate solution. Representative examples which satisfy the above definition can be generally characterized by the following physical properties: loss on ignition (at 1,000° C for 1 hour) less than 25 percent by weight, an average pore volume of at least 0.2 cc/g and an alumina content of at least 50 percent by weight.

As used in the present specification and claims, the expression "alkali aluminate" means the aluminum salt of an alkali metal, such as for example sodium and potassium.

While the present process is applicable to the purification of impure alkali aluminate solutions regardless of source, the novel method will be explained in detail with regard to the purification of impure Bayer process liquors. Under the term "Bayer process liquor" the liquor resulting from the alkali extraction of aluminous ores is to be understood.

Production of alumina hydrates from aluminous ores by the Bayer process is well known in the art and involves subjecting a slurry of ore to a digestion in a caustic solution of predetermined concentration. This treatment is accomplished at elevated temperatures under steam pressures to extract the caustic soluble alumina present in the ore and to produce a sodium aluminate liquor. The resulting sodium aluminate liquor or Bayer process liquor contains suspended ore residues consisting essentially of hydrated ferric oxide, sodium aluminum silicates and other caustic insoluble components of the ore collectively called "red mud." Following the extraction stage, the sodium aluminate liquor is subjected to a clarification treatment wherein the majority of the insoluble residues is removed by settling and/or filtration. After the clarification treatment, the liquor which is substantially free of caustic insoluble compounds, is generally seeded with previously precipitated alumina hydrates to recover the alumina content of the liquor in the form of alumina hydrates.

The liquor which results from the clarification treatment consists essentially of sodium aluminate accompanied by caustic soluble organic and inorganic compounds together with finely suspended caustic insoluble particles. The liquor usually possesses a dark-brown or reddish-brown color due to the impurities present. If this liquor, contaminated with impurities, is subjected to seeding with the resultant precipitation of the alumina in the form of hydrates, the precipitated alumina hydrates will be contaminated with metallic impurities and the color of the precipitate will be reddish brown. It is believed that the discoloration and metallic impurity content of the precipitate is due to sorption of these impurities on the surface of the freshly precipitated alumina hydrates. The discolored and impure alumina hydrate is undesirable for many purposes, particularly when the alumina hydrate is to be utilized without a high temperature calcination.

A typical analysis of the alumina hydrates precipitated by the usual techniques from a Bayer process plant liquor is shown below:

Table I

| Compound | Typical Range |
|---|---|
| $Al_2O_3$, % | 64.7 – 64.9 |
| $Na_2O$, % | 0.37 – 0.49 |
| $Fe_2O_3$, ppm | 75 – 103 |
| $SiO_2$, % | 0.008 – 0.013 |
| CaO, % | 0.039 – 0.087 |
| Zn, ppm | .59 – 98 |
| LOI* % | 34.5 – 34.8 |
| Color | discolored |

*LOI (Loss on Ignition) measured at 1,000°C for 1 hour.

It can be seen that notwithstanding the discoloration of the product, the metallic impurity content, particularly the $Fe_2O_3$, $SiO_2$, CaO and Zn content, renders the product undesirable.

In accordance with the novel process of the present invention, it has now been surprisingly found that in a single stage treatment both the discoloration and the metallic impurity problem can be economically and efficiently solved.

According to the process of the invention, impure Bayer process liquor is subjected to a purification treatment after separation from the red mud but before seeding and precipitation of the alumina hydrates.

The Bayer process liquor utilized in the process of the invention can be obtained by the digestion of any type of bauxite ore. Depending on the type of ore utilized, constituents of the ore, and consequently the process conditions, may vary. Typical bauxite ores on the dry basis contain 55–65% $Al_2O_3$, 2–30% $Fe_2O_3$ and minor amounts of metallic impurities such as Si, Ti, Zn, V, Ca, Mg, organic impurities such as oxalates, lignin derivatives, etc. Regardless of the type of bauxite utilized in the Bayer process, the resulting sodium aluminate liquor will be contaminated with the aforementioned caustic soluble organic and inorganic compounds and the liquor will possess a reddish-brown color.

The liquor obtained from the Bayer process by settling and/or filtration still possesses a dark color, indicating that neither settling nor filtration is capable of removing the color bodies from the liquor. The discolored liquor, after the clarification step, is treated in accordance with the novel process of the invention with an active alumina having the following characteristics: alumina ($Al_2O_3$) content at least 50 percent by weight, surface area at least 50 m²/g, an average pore volume at least 0.2 cc/g and a loss on ignition of not more than 25 percent by weight.

In a convenient and efficient manner the liquor obtained from the clarification step is contacted with the active alumina by introducing the active alumina into the liquor which is kept in a holding vessel. To achieve intimate contact between the active alumina and the liquor, agitation of the contents of the vessel is recommended.

The quantity of active alumina used for the purification treatment is generally a small, but effective, amount and it usually depends on the quantity of impurities present in the liquor, the caustic concentration of the liquor and also on the surface area of the active alumina used for the treatment.

For example, it has been found that active alumina in quantities as little as 0.25 g per liter of liquor is effective to provide good results in producing alumina hydrates of enhanced whiteness and improved quality.

Thus, when an impure Bayer process liquor resulting from the alkali digestion of Jamaican North Coast bauxite is treated with approximately 1 g of active alumina per liter of liquor, the alumina hydrate precipitated from the treated liquor exhibits enhanced whiteness and reduced metallic impurity content in comparison to untreated liquor.

The upper limit of active alumina quantity used for the treatment is generally limited by: (1) the alumina content of the liquor (degree of saturation), the temperature and time of the treatment, and the surface area of the active alumina. However, it can be stated that when an impure Bayer process liquor is treated with an active alumina of the above characteristics and the alumina content of the Bayer liquor (calculated as $Al_2O_3$) is between about 100–170 g/l, while the caustic concentration is between 140–240 g/l (calculated as $Na_2CO_3$), active alumina quantities between 0.25–10 g/l, preferably 0.5–5 g/l of liquor achieve the stated purpose.

The temperature of the treatment is usually adjusted in accordance with the alumina concentration of the liquor to be treated. As the Bayer process liquor in most instances is a supersaturated solution in relation to the dissolved alumina content, it is desirable to maintain this stage of supersaturation during the entire treatment without causing precipitation. The supersaturation can be conveniently maintained by controlling the temperature of the treatment between about 40°–90° C, preferably between about 60°–80° C. At these temperatures, and within the caustic concentrations recited, no precipitation of the alumina hydrates will occur, regardless of the addition of the active alumina treating agent.

The time period of the treatment is usually determined experimentally. In general, residence times between 10 minutes and 10 hours were found to be satisfactory and good results are obtained within 0.3–5 hours.

The treated liquor, after the treatment, is separated from the active alumina sorbent. This separation can be conveniently accomplished by filtration, since the active alumina utilized for the treatment is usually granular or shaped, which facilitates filtration. Care is to be taken to keep the temperature of the treated liquor above 40° C, preferably at 50° C or above, during filtration to avoid autoprecipitation of the alumina hydrate.

In an advantageous embodiment of the present invention, the impure Bayer liquor can be purified by conducting the liquor through a bed of granular or shaped alumina. The contact time between the action alumina and the liquor in this manner of treatment is usually shorter due to the larger available surface area. In this type of purification the temperature of the active alumina bed and the liquor to be treated should be carefully maintained in excess of 40° C to avoid precipitation of the alumina hydrates on the active alumina.

When the aluminate liquor is treated by conducting it at high flow rates through a column containing a bed of active alumina, the small but effective amount of alumina utilized for the treatment is in relationship to the large total volume of liquor treated on the column. Thus, for example, if the column contains 100 kg. active alumina, the volume of liquor which can be treated in accordance with the invention can be from about 10,000 to about 40,000 liter of liquor. Treatment times between 10 and 60 minutes are considered advantageous in this manner of operation, depending on the flow rate and total surface area.

After the treatment, which includes filtration, is complete, whether using a stirred vessel or a bed of active alumina, the treated liquor is ready to be subjected to precipitation. The precipitation can be accomplished in a well known manner, such as for example temperature reduction or seeding or both.

Surprisingly, it was discovered that while the treated liquor retained its reddish-brown color, the alumina hydrates precipitated from the treated liquor were of enhanced whiteness and the metallic impurities associated with the alumina hydrates were either eliminated or significantly reduced. The filter residue of the treatment, however, exhibited a dark brownish color and was high in metallic impurities, indicating that the active alumina removed undesirable color bodies and metallic impurities from the liquor, which otherwise would have coprecipitated with the alumina hydrates or would have coated the surface of the hydrates. The reason for this selective sorption is not known, but it is believed that the active alumina removes by sorption high molecular weight organics which are mainly responsible for the discoloration of the hydrates as well as metallic impurities occluded in the organics.

It is to be noted that the active alumina utilized in the process should be substantially insoluble in the liquor during the treatment. By substantially insoluble, an active alumina is understood which retains at least 70 percent of its weight during the treatment. This criterion is important to avoid precipitation of the hydrates during the treatment or filtration as a result of the concentration change in the supersaturated solution.

After the precipitation step, the alumina hydrates of enhanced whiteness and improved purity are recovered by known methods and are capable of being utilized for any desired purpose.

The following examples will further illustrate the novel aspects of the present invention.

EXAMPLE I

Jamaican bauxite ore was subjected to alkali digestion according to the Bayer process, and the resulting liquor was separated by settling from the red mud. 150 liters of the clarified brown colored liquor, containing 125 g/l alumina (calculated as $Al_2O_3$), 179 g/l caustic (calculated as $Na_2CO_3$) and impurities was introduced into a holding vessel equipped with an agitator. The contents of the vessel were kept at about 66° C under agitation, and 1 g/l of granular active alumina was added. The active alumina had the following characteristics: essentially chi-rho and pseudogamma structure, surface area 262 m²/g, $Al_2O_3$ content 94.0 percent by weight, pore volume 0.227 cc/g. The liquor and the active alumina therein was kept under agitation for about 4 hours, and the temperature of the mixture was maintained at about 66° C during the entire treatment. Subsequently, the liquor was filtered, the filtrate seeded and the alumina hydrate recovered. For comparison purposes, untreated Bayer liquor was also seeded and alumina hydrates were precipitated. Comparison between the alumina hydrates are given in Table II.

EXAMPLE II

The same Bayer liquor used in Example I was utilized for this example. To 1 liter of the liquor, 8 grams of carbonaceous filter grade carbon, commercially sold and characterized by the following data: 12×20 mesh (U.S. Standard screen), surface area 1,050 m²/g, pore volume 0.6 cc/g, was added. The liquor was kept at 66° C and the filter aid uniformly distributed within the liquor by agitation. The hot solution was filtered and the filtrate seeded to precipitate alumina hydrates. The hydrates were analyzed and the results shown in Table II below.

EXAMPLE III

An untreated Bayer liquor, such as employed in Example I, was utilized for this example. To 1 liter of the liquor, 10 grams of fibrous alpha-methyl cellulose (commercially sold as Solka-Floc BW-40) was added under agitation. The agitated mixture was kept at 66° C for 3 hours and then filtered. The filtrate was seeded, the precipitated alumina hydrate recovered and analyzed. The results are shown in Table II below.

Table II

| Specification of Alumina Hydrates | Control (untreated) Bayer Liquor | I Active Alumina Treated Bayer Liquor | II Carbonaceous Filter Treated Liquor | III Alpha-Methyl Cellulose Treated Bayer Liquor |
|---|---|---|---|---|
| % $Na_2O$ | 0.44 | 0.24 | 0.27 | 0.31 |
| ppm $Fe_2O_3$ | 93 | 17 | 54 | 32 |
| Zn | 120 | 20 | 80 | 82 |
| $SiO_2$ | 110 | 70 | 70 | 70 |
| CaO | 630 | 220 | 490 | 520 |
| Whiteness* | 4 | 0 | 2 | 2 |

* Color comparison was accomplished by using a microscopic color comparator, and as standard (Color O) an alumina hydrate was employed which was prepared by reacting chemically pure (c.p. grade) $AlCl_3$ with c.p. grade ammonium hydroxide. The precipitate was washed several times with deionized water and dried for the same period (1 hour) and the same temperature as the samples from Examples 1-4. 0 whiteness means equal to color standard, while increasing numbers to 4 mean increasing discoloration.

From the results shown in Table II, it is evident that the effect of the active alumina surpasses any of the presently utilized purifying agents by providing simultaneously enhanced whiteness and improved purity, while providing considerable savings on the basis of economy and ease of treatment.

The following Table shows the effect of varying active alumina quantities on hydrate color and impurity level:

Table III

| Impurities | Hydrate from Untreated Liquor | Hydrate from Treated Liquor — Active Alumina** Additions in g/l | | | | | |
|---|---|---|---|---|---|---|---|
| | | 0.25 | 0.5 | 1.5 | 3 | 4 | 10 |
| ppm $Fe_2O_3$ | 93 | 64 | 51 | 17 | 21 | 0 | 0 |
| $SiO_2$ | 110 | 95 | 76 | 43 | — | — | — |
| CaO | 630 | 630 | 540 | 150 | 38 | 44 | — |
| Whiteness* | 4 | 1 | 1 | 0 | 0 | 0 | 0 |

* Color determined by comparison as shown for results in Table II
** Surface area of active alumina in excess of 50 m²/g It is to be understood that the novel principles of this invention are broader than the specific embodiments recited above, and the scope of the present invention is only limited by the appended claims.

What is claimed is:

1. A method of producing alumina hydrate of enhanced whiteness and reduced metallic impurity content from Bayer process alkali aluminate liquors containing undesired color bodies and metallic impurities which comprises:
   a. contacting impure alkali aluminate liquor with an active alumina characterized by a surface area of at least about 50 m²/g, an average pore volume of at least about 0.2 cc/g, a loss on ignition of not more than about 25 percent by weight and weight loss of less than 30 percent in an alkali aluminate solution containing 140–240 g/l caustic (calculated as $Na_2CO_3$) at temperatures between about 40°–90° C.;
   b. maintaining intimate contact between the liquor and the active alumina for a time sufficient to effect sorption of color bodies and metallic impurities on the surface of the active alumina without precipitation of alumina hydrates; and
   c. separating the liquor from the active alumina and recovering the purified alumina hydrates.

2. Method according to claim 1 wherein the intimate contact between the impure alkali aluminate liquor and active alumina is accomplished by agitation and the impure alkali aluminate liquor has an alumina content in the range of 100 and 170 grams per liter (calculated as $Al_2O_3$) and a caustic concentration (calculated as $Na_2CO_3$) in the range of 140–240 grams per liter and the active alumina is present in an amount from about 0.25 gram per liter to about 10 grams per liter.

3. Method according to claim 2 wherein the quantity of active alumina is from about 0.5 gram per liter to about 5 grams per liter.

4. Method according to claim 1 wherein the alkali aluminate liquor is passed through a bed of active alumina for a time sufficient to effect sorption of color bodies and metallic ion impurities on the surface of the active alumina.

5. Method according to claim 1 wherein the temperature of the liquor during contact with the active alumina is maintained between about 40° and 90° C.

6. Method according to claim 5 wherein the temperature of the liquor during contact with the active alumina is maintained between about 60° and 80° C.

7. Method according to claim 1 wherein the intimate contact between the liquor and the active aluminum is maintained between about 10 minutes and 10 hours.

8. Method according to claim 7 wherein the time of contact between the liquor and the active alumina is between about 0.3 hour and 5 hours.

* * * * *